(12) United States Patent
Kobayashi et al.

(10) Patent No.: US 10,604,129 B2
(45) Date of Patent: Mar. 31, 2020

(54) VEHICLE BRAKE DEVICE

(71) Applicants: ADVICS CO., LTD., Kariya-shi, Aichi (JP); TOYOTA JIDOSHA KABUSHIKI KAISHA, Toyota-shi, Aichi (JP)

(72) Inventors: Tatsushi Kobayashi, Kariya (JP); Masaaki Komazawa, Miyoshi (JP); Yusuke Kamiya, Okazaki (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 95 days.

(21) Appl. No.: 15/549,433

(22) PCT Filed: Jan. 29, 2016

(86) PCT No.: PCT/JP2016/052728
§ 371 (c)(1),
(2) Date: Aug. 8, 2017

(87) PCT Pub. No.: WO2016/132865
PCT Pub. Date: Aug. 25, 2016

(65) Prior Publication Data
US 2018/0029576 A1    Feb. 1, 2018

(30) Foreign Application Priority Data
Feb. 20, 2015    (JP) ................................ 2015-031465

(51) Int. Cl.
*B60T 8/88*    (2006.01)
*B60T 17/18*    (2006.01)
(Continued)

(52) U.S. Cl.
CPC .................. *B60T 8/88* (2013.01); *B60T 8/17* (2013.01); *B60T 8/363* (2013.01); *B60T 8/4077* (2013.01);
(Continued)

(58) Field of Classification Search
CPC .... B60T 8/94; B60T 17/221; B60T 2270/406; B60T 17/18; B60T 2270/404; B60T 2270/82; B60T 8/268
(Continued)

(56) References Cited

U.S. PATENT DOCUMENTS 5,221,125 A * 6/1993 Okochi ................. B60T 8/3615
                                                              188/151 A
8,007,056 B2 * 8/2011 Ohkubo ................ B60T 8/4081
                                                              303/122
(Continued)

FOREIGN PATENT DOCUMENTS

JP    2000-344071 A    12/2000
JP    2013-107560 A     6/2013
(Continued)

OTHER PUBLICATIONS

International Search Report (PCT/ISA/210) dated Mar. 1, 2016, by the Japanese Patent Office as the International Searching Authority for International Application No. PCT/JP2016/052728.
(Continued)

*Primary Examiner* — Bradley T King
*Assistant Examiner* — Mahbubur Rashid
(74) *Attorney, Agent, or Firm* — Buchanan Ingersoll & Rooney PC

(57) ABSTRACT

Provided is a brake device capable of detecting abnormality condition of a subject valve without using a wheel pressure sensor and the vehicle brake device includes a valve which is configured to open and close a fluid passage connected to
(Continued)

the master chamber and at the same time which is a subject valve for a subject of failure judgement and an abnormality judging portion which is configured to judge whether or not the subject valve is in an abnormal state based on an advancement amount of the master piston accompanying an opening of the subject valve.

4 Claims, 7 Drawing Sheets

(51) Int. Cl.
    *B60T 8/17*     (2006.01)
    *B60T 8/48*     (2006.01)
    *B60T 8/40*     (2006.01)
    *B60T 8/94*     (2006.01)
    *B60T 8/36*     (2006.01)
    *B60T 8/44*     (2006.01)
    *B60T 17/22*     (2006.01)

(52) U.S. Cl.
    CPC .................. *B60T 8/44* (2013.01); *B60T 8/48* (2013.01); *B60T 8/94* (2013.01); *B60T 17/18* (2013.01); *B60T 17/221* (2013.01); *B60T 2270/404* (2013.01); *B60T 2270/82* (2013.01)

(58) Field of Classification Search
    USPC ......................................................... 303/122
    See application file for complete search history.

(56) References Cited

U.S. PATENT DOCUMENTS

| | | | | |
|---|---|---|---|---|
| 8,844,159 B2* | 9/2014 | Guyomarc'h | ........... | F26B 15/16 34/407 |
| 8,894,159 B2* | 11/2014 | Nakata | .................... | B60T 1/10 303/122 |
| 2001/0006306 A1* | 7/2001 | Kagawa | .................. | B60T 8/367 303/20 |
| 2001/0006308 A1* | 7/2001 | Kawahata | ............... | B60T 8/367 303/122 |
| 2001/0034574 A1* | 10/2001 | Tanaka | .................. | B60T 8/4036 701/70 |
| 2004/0183369 A1* | 9/2004 | Soga | ........................ | B60T 8/268 303/113.4 |
| 2006/0131953 A1* | 6/2006 | Nakayama | .............. | B60T 7/042 303/122 |
| 2007/0267915 A1* | 11/2007 | Shimada | .................. | B60K 6/44 303/122 |
| 2010/0131151 A1* | 5/2010 | Izumikawa | ............. | B60T 7/042 701/29.2 |
| 2012/0126610 A1 | 5/2012 | Nakata et al. | | |
| 2012/0283926 A1* | 11/2012 | Ito | ......................... | B60T 8/4018 701/70 |
| 2012/0313427 A1* | 12/2012 | Nishioka | ................. | B60T 7/042 303/10 |
| 2013/0127240 A1 | 5/2013 | Noro et al. | | |
| 2014/0020377 A1* | 1/2014 | Ito | .......................... | F15B 15/00 60/534 |
| 2015/0091369 A1* | 4/2015 | Yamasaki | ............. | B60T 8/4081 303/10 |

FOREIGN PATENT DOCUMENTS

WO      WO-2008041104 A1 *    4/2008     ........... B60T 8/3655
WO      WO 2010/109525 A1      9/2010

OTHER PUBLICATIONS

Written Opinion (PCT/ISA/237) dated Mar. 1, 2016, by the Japanese Patent Office as the International Searching Authority for International Application No. PCT/JP2016/052728.

Office Action (Second Office Action) dated Sep. 11, 2019 by the China National Intellectual Property Administration in corresponding Chinese Patent Application No. 201680010806.6 and an English Translation of the Office Action. (15 pages).

\* cited by examiner

VEHICLE BRAKE DEVICE

TECHNICAL FIELD

This invention relates to a vehicle brake device.

BACKGROUND ART

Conventionally, as a vehicle brake device, a device, which generates a braking force at a wheel of a vehicle based on a hydraulic pressure in a master chamber generated in response to a movement of a master piston, is mounted on the vehicle. A wheel cylinder, for example, is the device that generates the braking force at the wheel. Generally, a valve which opens or closes a fluid flow passage, is provided in a conduit which is connected to the master chamber. For example, valves are provided in conduits which connects the master chamber and the wheel cylinder and in conduits or the like which connects the master chamber and a reservoir through the wheel cylinder. Whether these valves are in abnormal state or not can be, for example, judged by means of a wheel pressure sensor which detects a hydraulic pressure in the wheel cylinder (wheel pressure). The vehicle brake device which detects an abnormality of valve is disclosed, for example, in PCT International Patent Publication 2010/109525 A.

CITATION LIST

Patent Literature

[Patent Literature 1] PCT Patent Publication 2010/109525 A

SUMMARY OF INVENTION

Technical Problem(s)

It is noted here that recently, a vehicle brake device which has a brake-by-wire structure, in which a brake pedal and an actuator cooperatively associated with each other through an ECU (Electronic Control Unit) has been increasing. Since the brake-by-wire structure is formed to computer-control the actuator, upon normal brake control operation, the wheel pressure sensor can be eliminated. However, if such wheel pressure sensor is eliminated from the vehicle brake device, an issue associated with a valve abnormality detection may arise. For example, when a leakage abnormality in a valve occurs, unless such abnormality is properly detected, a load is applied to a reservoir in the actuator, which may lead to a deterioration of a reservoir durability.

Accordingly, this invention was made in consideration with the above-mentioned situation and the objective of the invention is to provide a vehicle brake device which can detect an abnormality in the subject valve, without using a wheel pressure sensor.

Solution to Problem(s)

The vehicle brake device according to the invention is characterized in that the vehicle brake device which generates a braking force at a wheel of a vehicle in response to a hydraulic pressure of a master chamber in which the hydraulic pressure is generated by a movement of a master piston, includes a valve which opens and closes a hydraulic pressure path connected to the master chamber and which is a subject valve for an abnormality judgement and an abnormality judging portion which judges whether or not the subject valve is in abnormal state or not based on an advance movement of the master piston caused by an opening operation of the subject valve.

Effect of Invention

According to the invention, since the abnormality judgement for the subject valve is made utilizing a principle that the master piston advances in response to the change of the hydraulic pressure in the master chamber, for example, even the case that a subject valve is a valve disposed between the master chamber and the wheel cylinder, an abnormality of the subject valve can be detected without using a wheel pressure sensor.

BRIEF EXPLANATION OF ATTACHED DRAWINGS

EMBODIMENTS FOR IMPLEMENTING INVENTION

Figure 1:
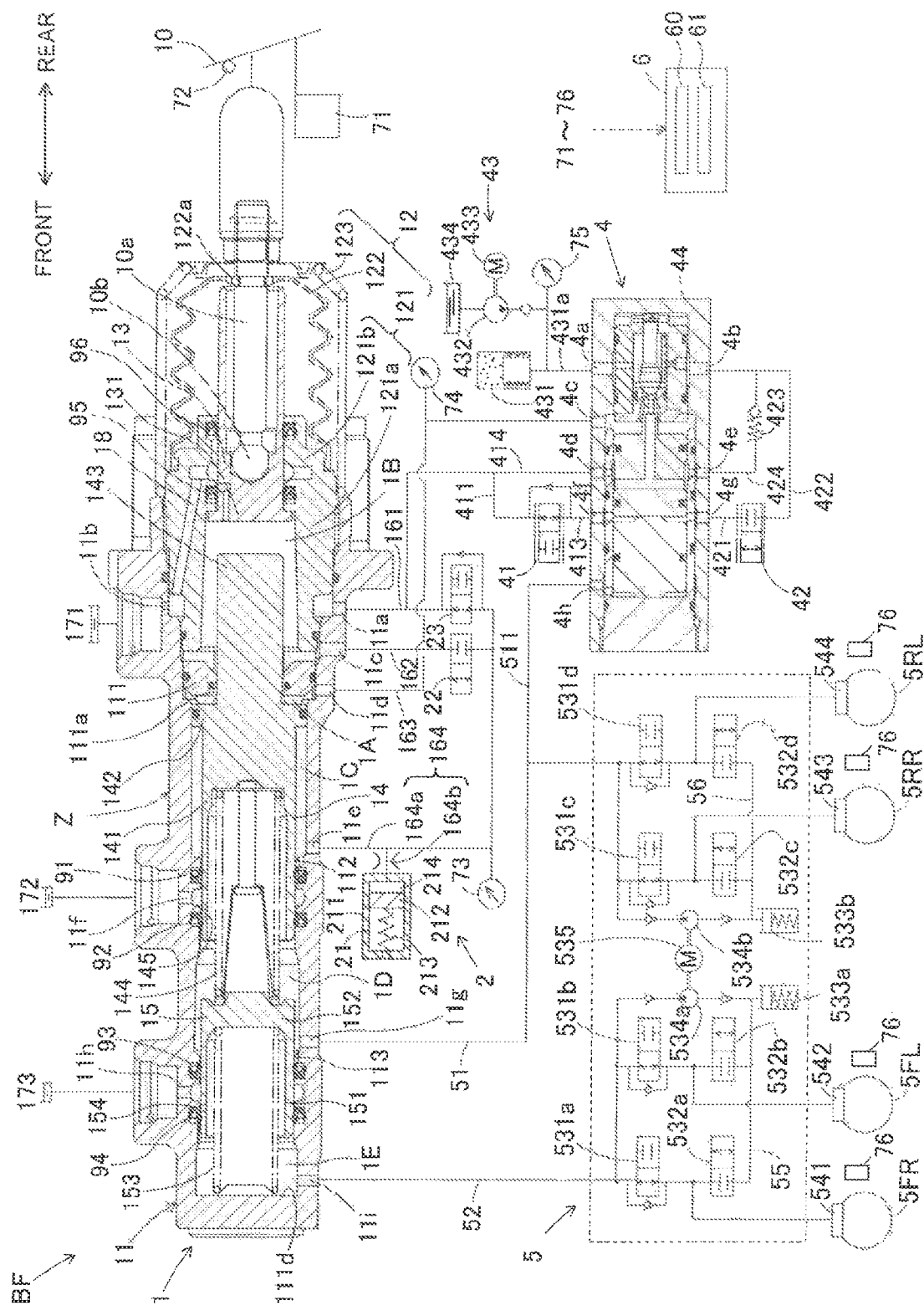
FIG. 1 is a structural view of the vehicle brake device according to an embodiment of the invention.

The embodiments of the invention will be explained hereinafter with reference to the attached drawings. It is noted that each drawing used for explanation shows a conceptual drawing and the shape of each portion in the drawings does not necessarily indicate an accurate shape in practical use. As shown in FIG. 1, the vehicle brake device according to a first embodiment of the invention is formed by a hydraulic pressure braking force generating device BF which generates a hydraulic pressure braking force at vehicle wheels 5FR, 5FL, 5RR and 5RL and a brake ECU 6 which controls the hydraulic pressure braking force generating device B F.

(Hydraulic Pressure Braking Force Generating Device BF)

The hydraulic pressure braking force generating device BF is formed as shown in FIG. 1, by a master cylinder 1, a reaction force generating device 2, a first control valve 22, a second control valve 23, a servo pressure generating device (corresponding to "a driving portion") 4, an actuator 5 wheel cylinders 541 through 544 and various sensors 71 through 76.

(Master Cylinder 1)

The master cylinder 1 is a portion which supplies the actuator 5 with an operating fluid in response to the operating amount of a brake pedal 10 and is formed by a main cylinder 11, a cover cylinder 12, an input piston 13, a first master piston 14 and a second master piston 15 and so on.

The brake pedal 10 may be of any type of brake operating means that can perform brake operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion in front and rearward direction. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than the inner diameter of the front portion 121a.

The dust prevention purpose boots 122 is of tubular bellow shaped and is extendible or compressible in front and rearward directions. The front side of the boots 122 is assembled to be in contact with the rear end side opening of the cylindrical portion 121. A through hole 122a is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical portion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111a of the inner wall portion 111. The rear end of the projection portion 143 projects into an inner space of the cylindrical portion 121, passing through the through hole 111a and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side (front end surface, inner peripheral surface) of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The front-end portion and the rear end portion of the flange portion 142 of the first master piston 14 separate the rear chamber into a front portion and a rear portion and a "second hydraulic pressure chamber 1C" is defined at the front side of the rear chamber and a "servo chamber (corresponding to the output chamber) 1A" is defined at the rear side of the rear chamber. Further, a "first hydraulic pressure chamber 1B" is defined by the inner peripheral surface of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171 (low pressure source).

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 1C with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like (see black circles indicated in the drawings) are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

The stroke sensor 71 is a sensor which detects the operating amount (stroke) of the brake pedal 10 operated by a driver of the vehicle and transmits the detected result to the brake ECU 6. The brake stop switch 72 is a switch which detects whether the brake pedal 10 is depressed or not, using a binary signal and the detected signal is sent to the brake ECU 6.

(Reaction Force Generating Device 2)

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the forward side direction by a compression spring 213 and a reaction force hydraulic pressure chamber 214 is formed at a location forward side of the piston 212. The reaction force hydraulic pressure chamber 214 is connected to the second hydraulic pressure chamber 1C via a conduit 164 and the port 11e, and is connected further to the first control valve 22 and the second control valve 23 via the conduit 164.

An orifice 164b is provided in at least a portion of the conduit 164 which connects the second hydraulic pressure chamber 1C and the stroke simulator 21. In more detail, according to the embodiment, the conduit 164 is formed by a main conduit portion 164a which connects the port 11e and the first and the second control valves 22 and 23 and the orifice 164b which forms a conduit branched from the main conduit portion 164a to the stroke simulator 21. The orifice 164b according to the embodiment is formed by a conduit which flow path (pipe inner diameter) is completely or partially narrowed compared to the flow path of the main conduit portion 164a. The pressure sensor 73 is in communication with the main conduit portion 164a. It is noted that instead of providing the orifice 164b, a conduit which inner diameter is constant or an electromagnetic valve which can control the flow-rate of fluid in the conduit may be used.

(First Control Valve 22)

The first control valve 22 is an electromagnetic valve which is structured to close under non-energized state and opening and closing operations thereof are controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 10.

The first control valve 22 is closed under non-energized state where an electricity is not applied and under this state, communication between the first hydraulic pressure chamber 1B and the second hydraulic pressure chamber 1C is interrupted. Due to the closure of the first hydraulic pressure chamber 1B, the operating fluid is nowhere to flow and the input piston 13 and the first master piston 14 are moved integrally keeping a constant separation distance therebetween. The first control valve 22 is open under the energized state where an electricity is applied and under such state, the communication between the first hydraulic pressure chamber 1B and the second hydraulic pressure chamber 1C is established. Thus, the volume changes in the first hydraulic pressure chamber 1B and the second hydraulic pressure chamber 1C due to the advancement and retreatment of the first master piston 14 can be absorbed by the transferring of the operating fluid.

The pressure sensor 73 is a sensor which detects the reaction force hydraulic pressure of the second hydraulic pressure chamber 1C and the first hydraulic pressure chamber 1B and is connected to the conduit 164. The pressure sensor 73 detects the pressure of the second hydraulic pressure chamber 1C while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve 23)

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the second hydraulic pressure chamber 1C via the port 11e and the conduit 161 is in communication with the reservoir 171 via the port 11a. Accordingly, the second control valve 23 establishes the communication between the second hydraulic pressure chamber 1C and the reservoir 171 under the non-energized state thereby generating no reaction force hydraulic pressure but the second control valve 23 interrupts the communication therebetween under the energized state thereby generating the reaction force hydraulic pressure.

(Servo Pressure Generating Device 4)

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state (normally open valve) and the flow-rate (or, the pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 (corresponding to the low-pressure source) via the conduits 411 and 161 and ports 11a and 11b. It is noted here that the conduit 411 may not necessarily be connected to the reservoir 171, but may be connected to a reservoir 434, instead, which will be explained later. In such alternative case, the reservoir 434 corresponds to the low-pressure source of the invention. Further, as another alternative, a reservoir common to both of the reservoir 171 and the reservoir 434 may be used.

The pressure increasing valve 42 is an electromagnetic valve structured to close under a non-energized state (normally closed valve) and the flow-rate (or pressure) thereof is controlled by the brake ECU 6. One end of the pressure increasing valve 42 is connected to the conduit 421 and the other end thereof is connected to the conduit 422.

Figure 2:
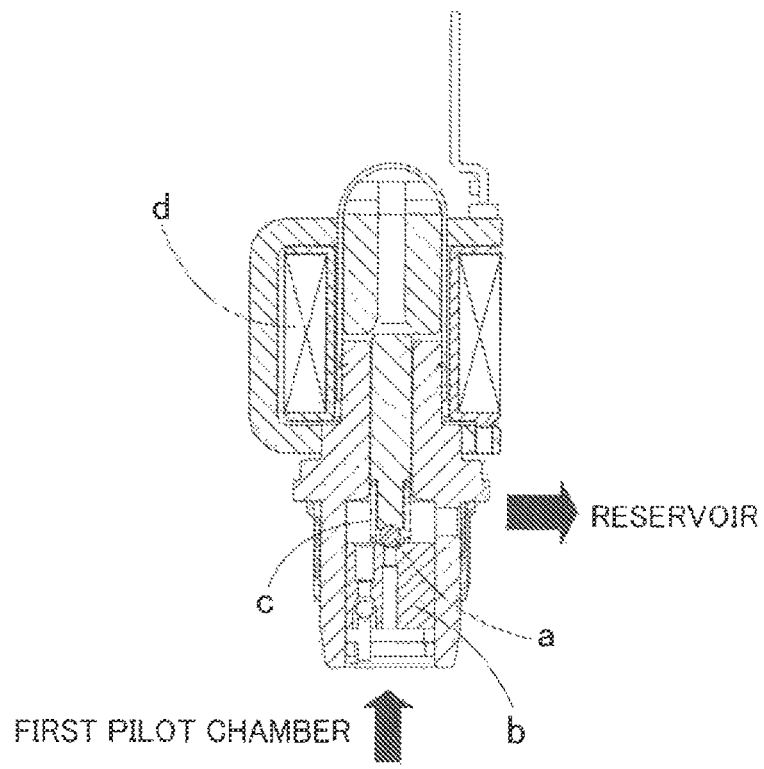
FIG. 2 is a conceptual view for explaining an example of an electromagnetic valve.

One example of a normally open type electromagnetic valve which is used for the pressure decreasing valve 41 will be schematically explained hereinafter. As shown in FIG. 2, the electromagnetic valve (pressure decreasing valve 41) is formed by a valve member "a", a valve seat "b", a spring "c" which biases the valve member "a" in a valve opening direction (in a direction where the valve member "a" is separated from the valve seat "b"), and a coil (solenoid) "d" which generates an electromagnetic driving force for pushing the valve member "a" in a valve closing direction when energized. When a current flowing through the coil "d" is less than a valve closing current, the valve member "a" and the valve seat "b" are separated from each other by the biasing force of the spring "c" and the electromagnetic valve is in a valve open state. However, when a current flowing through the coil "d" is equal to or more than the valve closing current, the valve member "a" is brought into contact with the valve seat "b" by the electromagnetic driving force, which is generated at the coil "d" to push the valve member "a" in the valve closing direction. The electromagnetic driving force becomes larger than the sum of the biasing force of the spring "c" and a pressure differential operation force generated by the pressure difference between an inlet side and an outlet side of the electromagnetic valve when the current flowing through the coil "d" is equal to or more than the valve closing current and the electromagnetic valve is closed. The value of the valve closing current (minimum control current which can close the valve) is decided by the pressure difference between the inlet side and the outlet side of the electromagnetic valve.

As explained, the opening and closing operations of the pressure decreasing valve 41 and the pressure increasing valve 42 are decided by a force balance among the electromagnetic driving force which is generated by the current flowing through the coil "d", the biasing force of the spring "c" and the pressure differential operation force generated by the pressure difference between the inlet side and the outlet side of the electromagnetic valve and are controlled by the current (control current) supplied to the coil "d". It is noted here that the direction of biasing force of the spring and the direction of the electromagnetic driving force are decided according to the structure of the electromagnetic valve (normally open type or normally closed type and so on).

The pressure supplying portion 43 is a portion for supplying the regulator 44 mainly with a highly pressurized operating fluid. The pressure supplying portion 43 includes an accumulator 431 (corresponding to the high-pressure source), a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the operating fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the operating fluid to the accumulator 431 in order to recover a pressure up to the value equal to or more than the predetermined value.

Figure 3:
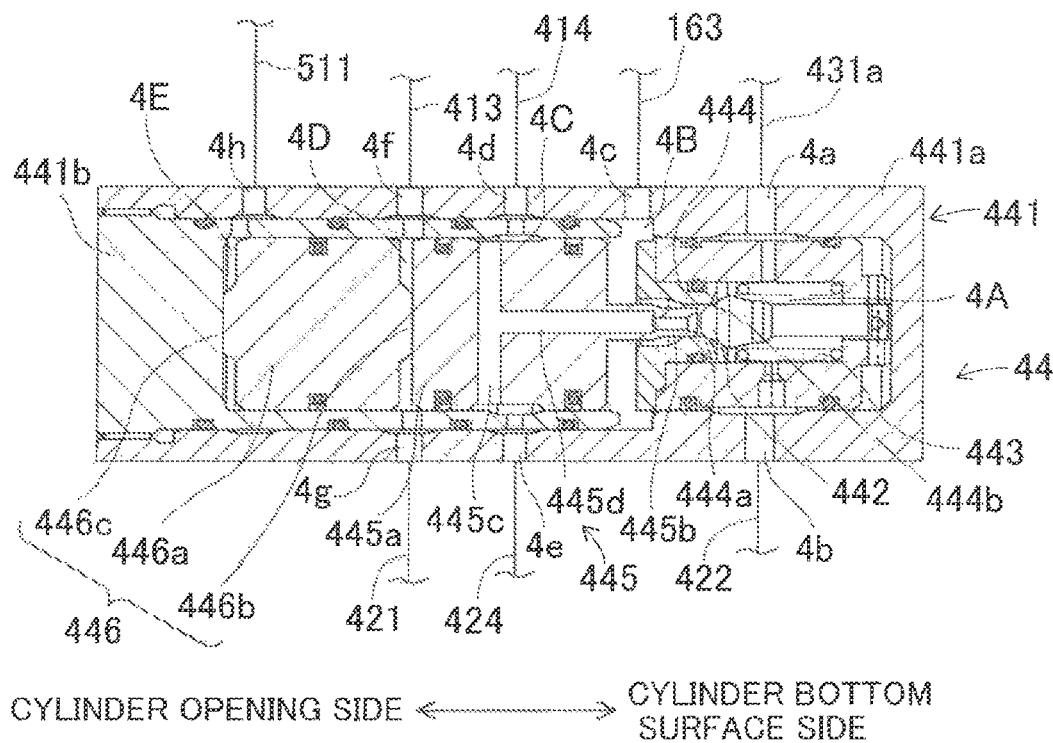
FIG. 3 is a cross sectional view of a regulator according to the embodiment.

The regulator 44 (corresponding to the pressure adjusting device) includes a cylinder 441, a ball valve 442, a biasing portion 443, a valve seat portion 444, a control piston 445 and a sub-piston 446 and so forth as shown in FIG. 3. The cylinder 441 includes a cylinder case 441a formed in a substantially bottomed cylinder-shape having a bottom surface at one end thereof (at the right side in FIG. 3) and a cover member 441b closing an opening of the cylinder case 441a (at the left side thereof in FIG. 3). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4d through 4h provided on the cylinder 441.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in fluid communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pressure (referred to also as "pilot pressure") in the first pilot chamber 4D and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing.

The regulator 44 is structured so that the more the flowing amount of the liquid flowing into the first pilot chamber 4D from the accumulator 431 increases, the larger the volume of the first pilot chamber 4D becomes and at the same time the more the flowing amount of the liquid flowing into the servo chamber 1A from the accumulator 431 increases and further, the more the flowing amount of the liquid flowing out from the first pilot chamber 4D into the reservoir 171 increases, the smaller the volume of the first pilot chamber 4D becomes and at the same time the more the flowing amount of the liquid flowing out of the servo chamber 1A into the reservoir 171 increases.

Further, the control piston 445 is provided with a damper device (not shown) at the wall portion facing to the first pilot chamber 4D. The damper device is structured as a stroke simulator and is provided with a piston portion which is biased towards the first pilot chamber 4D by a biasing member. By this provision of the damper device, the rigidity of the first pilot chamber 4D is variable in response to the pilot pressure.

(Actuator 5)

The actuator 5 is provided between the first master chamber 1D and the second master chamber 1E which generate the master cylinder hydraulic pressure and the wheel cylinders 541 through 544. The actuator 5 and the first master chamber 1D are in communication through the conduit 51 and the actuator 5 and the second master chamber 1E are in communication through the conduit 52. The actuator 5 adjusts the brake hydraulic pressure to be supplied to the wheel cylinders 541 through 544 based on the instructions from the brake ECU 6. The actuator 5 according to the embodiment forms an anti-lock brake system (ABS). The actuator 5 is formed with four channel system (dual circuitry system) corresponding to the respective wheel cylinders 541 through 544.

The actuator 5 is formed by holding valves 531a, 531b, 531c and 531d, pressure decreasing valves 532a, 532b, 532c and 532d, reservoirs 533a and 533b, pumps 534a and 534b and a motor 535. Each of the four channels has the same structure with one another and the explanation of the structure of the actuator 5 will be made representing one of the channels and the explanation of the other channels will be omitted. The holding valve 531d is an electromagnetic valve disposed between the first master chamber 1D and the wheel cylinder 544. First opening of the holding valve 531d is connected to the conduit 51, a first opening of the holding valve 531c and the pump 534b. The second opening of the holding valve 531d is connected to the wheel cylinder 544 and a first opening of the pressure decreasing valve 532d. The holding valve 531d is an electromagnetic valve which generates a pressure differential between the both openings and is a normally open valve which becomes an open state under non-energized state. The state of the holding valve 531d is switched over between the two states, one being a communication state in which the both openings are in communication (non-pressure differential state) and the other being a pressure differential state in which a pressure difference is generated between the two openings by the brake ECU 6. The pressure differential state can be controllable depending on the magnitude of the control current based on the instructions from the brake ECU 6.

The pressure decreasing valve 532d is disposed between the wheel cylinder 544 and the reservoir 533b. The pressure decreasing valve 532d establishes or interrupts the fluid communication between the wheel cylinder 544 and the reservoir 533b in response to the instructions from the brake ECU 6. The pressure decreasing valve 532d is a normally open type valve which is in a closed state under a non-energized state. The second opening of the pressure decreasing valve 532d is connected to the second opening of the pressure decreasing valve 532c and the reservoir 533b via the conduit 56. Similarly, the second opening of the pressure decreasing valve 532a is connected to the second opening of the pressure decreasing valve 532b and the reservoir 533a via the conduit 55.

The reservoir 533b has a hydraulic pressure chamber therein for reserving the operating fluid. The opening of the reservoir 533b is connected to the second opening of the pressure decreasing valve 532d and the pump 534b via conduit. The reservoir 533a is arranged to be commonly used for two channels of circuitry system at the conduit 52 side, whereas the reservoir 533b is arranged to be commonly used for two channels of circuitry system at the conduit 51 side. The pump 534b (534a) is a device driven by the motor 535 and returns the operating fluid in the reservoir 533b (533a) to the master cylinder 1 side. The motor 535 is driven in response to the instructions from the brake ECU 6.

The function of the actuator 5 will be briefly explained hereinafter. When both of the holding valves 531a through 531d and the pressure decreasing valves 532a through 532d are in non-energized state (normal braking state), the holding valves 531a through 531d are in valve opening state and the pressure decreasing valves 532a through 532d are in valve closed state. Therefore, the master chambers 1D and 1E are in communication with the wheel cylinders 541 through 544. Under such state, the wheel pressure which corresponds to the hydraulic pressure in the wheel cylinders 541 through 544 is controlled (pressure increase control) in response to the brake operation. Further, when the pressure differential state of the holding valves 531a through 531d is controlled, maintaining the pressure decreasing valves 532a through 532d to be in the closed state, the wheel pressure is controlled to be increased in response to the control of the holding valves 531a through 531d. Further, when the holding valves 531a through 531d are in the energized state and the pressure decreasing valves 532a through 532d are in non-energized state (valve closed state), the wheel pressure is maintained. In other words, in such state, the wheel pressure is controlled to be held. When both of the holding valves 531a through 531d and the pressure decreasing valves 532a through 532d are in the energized state, the fluid communication between the wheel cylinders 541 through 544 and the reservoirs 533a and 533b is established to control the wheel pressure to be decreased. By such pressure holding and decreasing controls, the wheel cylinder pressure is controlled not to lock the rotation of wheels of the vehicle.

(Brake ECU 6)

The brake ECU 6 is an electronic control unit and includes a microprocessor. The microprocessor includes an input/output interface, CPU, RAM, ROM and a memory portion such as non-volatile memory, connected with one another through bus communication. The brake ECU 6 is connected to the various sensors 71 through 76 for controlling each of the electromagnetic valves 22, 23, 41 and 42, the motor 433 and the actuator 5 and so on. The operating amount (stroke amount) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, the reaction force hydraulic pressure of the second hydraulic pressure chamber 1C or the pressure of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR, 5FL, 5RR and 5RL is inputted to the brake ECU 6 from each of the wheel speed sensors 76.

(Brake Control)

The brake control by the brake ECU 6 will be explained hereinafter. The brake control is a normal control of hydraulic pressure braking force. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first hydraulic pressure chamber 1B and the second hydraulic pressure chamber 1C is established. Thus, the brake control is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be a valve device which adjusts the flow-rate of the operating fluid which flows into or out of the first pilot chamber 4D. Under this brake control, the brake ECU 6 calculates a required braking force required by the driver of the vehicle based on the operating amount of the brake pedal 10 detected by the stroke sensor 71 (displacement amount of the input piston 13) or the operating force of the brake pedal 10 (for example, the hydraulic pressure detected at the pressure sensor 73). Then, based on the calculated required braking force, a target servo pressure is set. The pressure decreasing valve 41 and the pressure increasing valve 42 are controlled so that the actual servo pressure, which is the servo pressure detected at the pressure sensor 74 approximates the target servo pressure.

In more detail, under the state that the brake pedal 10 is not depressed, the brake control becomes the state as explained above, i.e., becomes the state that the ball valve 442 closes the through passage 444a of the valve seat portion 444. Under this state, the pressure decreasing valve 41 is in an open state and the pressure increasing valve 42 is in a closed state. In other words, the fluid communication between the first chamber 4A and the second chamber 4B is interrupted. The second chamber 4B is in communication with the servo chamber 1A via the conduit 163 to keep the hydraulic pressures in the two chambers 4B and 1A to be mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414 and 161. One side of the first pilot chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the two chambers 4E and 1D to be mutually equal to each other.

From this state, when the brake pedal 10 is depressed, the brake ECU 6 controls the pressure decreasing valve 41 and the pressure increasing valve 42 based on the target servo pressure. In other words, the brake ECU 6 controls the pressure decreasing valve 41 to close and controls the pressure increasing valve 42 to open. When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By the increase of the pressure in the first pilot chamber 4D, the control piston 445 slidably moves towards the cylinder bottom surface side. Then the tip end of the projecting portion 445b of the control piston 445 is brought into contact with the ball valve 442 to close the passage 445d by the ball valve 442. Thus, the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween. It is noted that the more the separated distance of the ball valve 442 from the valve seat surface 444*b* becomes large, the more the fluid passage for the operating fluid becomes large and accordingly, the flow-rate of the operating fluid in the fluid passage downstream of the ball valve 442 becomes high.

The brake ECU 6 controls the fluid passage downstream of the pressure increasing valve 42 to become large and at the same time controls the fluid passage downstream of the pressure decreasing valve 41 to become small so that the larger the displacement amount of the input piston 13 (operating amount of the brake pedal 10) detected by the stroke sensor 71, the higher the pilot pressure in the first pilot chamber 4D becomes. In other words, the larger the displacement amount of the input piston 13 (operating amount of the brake pedal 10), the higher the pilot pressure becomes and accordingly, the higher the servo pressure becomes. The servo pressure can be obtained from the pressure sensor 74 and can be converted into the pilot pressure.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the actuator 5, which will be explained later, and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the actuator 5 and a friction brake is operated to control brake operation of the vehicle. The force advancing the first master piston 14 forward under the "brake control" corresponds to a force corresponding to the servo pressure. When the brake operation is released, as opposite to the above, the pressure decreasing valve 41 is open and the pressure increasing valve 42 is closed to establish the fluid communication between the reservoir 171 and the first pilot chamber 4D. Then, the control piston 445 retreats and the vehicle returns to the state before depression of the brake pedal 10.

(Abnormality Judgement Control)

The abnormality judgement control which judges whether the holding valves 531*a* through 531*d* and/or pressure decreasing valves 532*a* through 532*d* (corresponding to the subject valve) are in an abnormal state (failure) or not will be explained hereinafter. The brake ECU 6, as a function, includes a control portion 60 which executes the brake control and the ABS control and an abnormality judging portion 61 which judges whether the holding valves 531*a* through 531*d* and/or pressure decreasing valves 532*a* through 532*d* are in an abnormal state or not. The abnormality judging portion 61 judges, as a principle, whether the pressure decreasing valves 532*a* through 532*d* are in an abnormal state or not based on the advancement amount of the first master piston.

(First Abnormality Judgement Control)

First, a first abnormality judgement control which is a control for detecting a valve opening failure of the pressure decreasing valves 532*a* through 532*d* will be explained hereinafter. The abnormality judging portion 61 executes a first control. In more detail, in the first control, the instructions are given to close respective one side pressure decreasing valves 532*b* and 532*c* (corresponding to first outlet valve) of each dual circuitry system, thereby to open respective one side holding valves 531*b* and 531*c* (corresponding to first inlet valve) of each dual circuitry system, to close respective the other side holding valves 531*a* and 531*d* (corresponding to second inlet valve) of each dual circuitry system and to close respective the other side pressure decreasing valves 532*a* and 532*d* (corresponding to second outlet valve) of each dual circuitry system. Then, the servo pressure generating device 4 is driven to advance the first master piston 14, then the holding valves 531*b* and 531*c* are closed and the pressure decreasing valves 532*a* and 532*d* are open and then, the holding valves 531*b* and 531*c* are open, in this order.

The abnormality judging portion 61 judges that the pressure decreasing valve 532*b* is in a valve opening failure state if the advancement amount of the first master piston 14 accompanying the opening of the holding valve 531*b* in the first control is equal to or more than a predetermined first range. Similarly, the abnormality judging portion 61 judges that the pressure decreasing valve 532*c* is in a valve opening failure state if the advancement amount of the first master piston 14 accompanying the opening of the holding valve 531*c* in the first control is equal to or more than a predetermined first range. The "valve opening failure state" means that a valve does not close for some reason. An open stuck state, leakage and a foreign substance stuck are the examples of the valve opening failure state. The "valve closing failure state" means that a valve does not open for some reason, such as for example, due to a closing stuck state or the like.

The principle of the abnormality judgement will be explained based on one circuitry system, as an example. First, pressure increase control is performed under the state that the brake operation is not performed, that one side holding valve 531*a* is in a closed state, while the other side holding valve 531*b* is in an open state and that both side pressure decreasing valves 532*a* and 532*b* are in closed states following the execution of the closing instructions. Thus, the servo pressure increases to advance the first master piston 14 thereby to increase the master pressure and accordingly the wheel cylinder pressure in the wheel cylinder 542. Under the increase of the wheel pressure at the one side wheel cylinder 542, the pressure increase of the servo pressure stops and the holding valve 531*b* becomes also in a closed state. Under the state that the wheel cylinder pressure of the wheel cylinder 542 and the master pressure become in equal level, the communication between the master cylinder 1 and the actuator 5 is interrupted (hereinafter referred to also as "interrupted state").

Under the interrupted state, a valve opening instruction is executed only for the one side pressure decreasing valve 532*a*. It is noted here that if the other side pressure decreasing valve 532*b* is not in the valve opening failure state, the fluid communications between the holding valve 531*b* and the reservoir 533*a* and between the holding valve 531*b* and the pressure decreasing valve 532*a* are interrupted by the pressure decreasing valve 532*b*. Therefore, the operating fluid (brake fluid) supplied from the master cylinder 1 is not supplied into the conduit 55 and accordingly, even the pressure decreasing valve 532*a* is opened, the operating fluid is not supplied to the wheel cylinder 541 side. Therefore, no influence on the wheel pressure at the wheel cylinder 542 is affected and the wheel pressure at the wheel cylinder 542 is not decreased. In other words, the wheel pressure at the wheel cylinder 542 is maintained to the same level with the master pressure. Under this state, even the holding valve 531*b* is opened, the first master piston 14 is not advanced and no servo pressure (value of the pressure sensor 74) change occurs.

Oppositely, when the other side pressure decreasing valve 532*b* is in the valve opening failure state, the fluid communications between the holding valve 531*b* and the reservoir 533*a* and between the holding valve 531*b* and the pressure decreasing valve 532*a* have been established by the pressure decreasing valve 532*b*, already before becoming the interrupted state. The master pressure and the wheel pressure at the wheel cylinder 542 are equal upon falling into the interrupted state. Under such interrupted state, when the pressure decreasing valve 532*a* is open, the fluid communication between the channel of no loaded state wheel cylinder 541 side and the channel of pressurized wheel cylinder 542 side is established by the pressure decreasing valve 532*b* and the conduit 55. Then, the operating fluid in the wheel cylinder 542 side flows out therefrom and flows into the wheel cylinder 541 side to thereby decrease the wheel pressure at the wheel cylinder 542.

It is noted here that when the holding valve 531*b* is open, since the master pressure under this state is greater than the wheel pressure at the wheel cylinder 542, the operating fluid is supplied from the master cylinder 1 to the actuator 5. Then the master pressure decreases and the second master piston 15 advances first and then accompanied by the advancement of the second master piston 15, the first master piston 14 advances (master pressure is smaller than the servo pressure). By the advancement of the first master piston 14, the volume of the servo chamber 1A increases to temporarily drop the servo pressure (value of the pressure sensor 74) which had held constant. As explained, since the advancement amount of the first master piston 14 accompanying the execution of the first control can be detected by detecting the change of the servo pressure, the valve opening failure of the pressure decreasing valve 532*b* can be appropriately judged without using the wheel pressure sensor.

Figure 4:
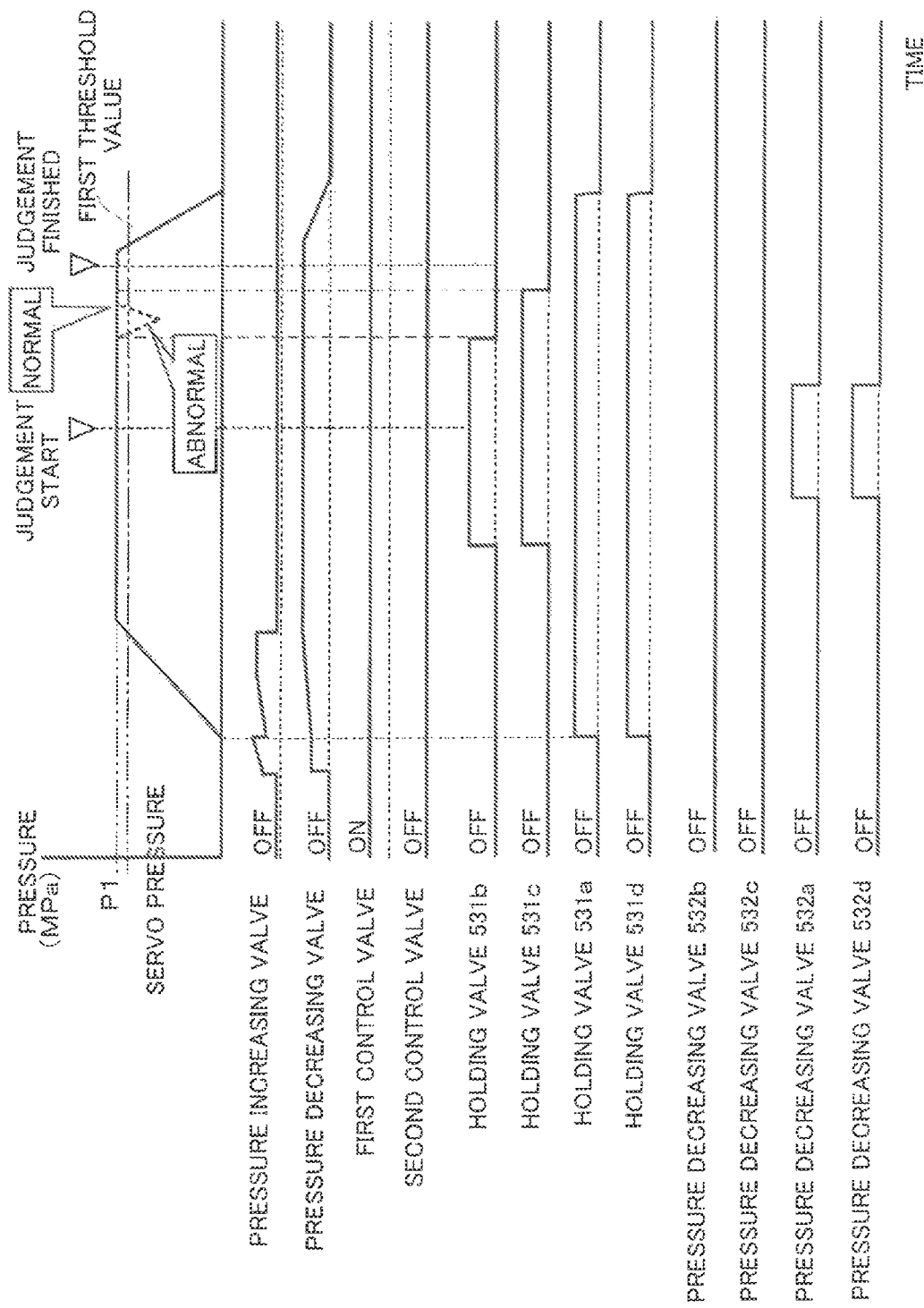
FIG. 4 is a time chart which explains a first abnormality judgement control according to the embodiment.
Figure 5:
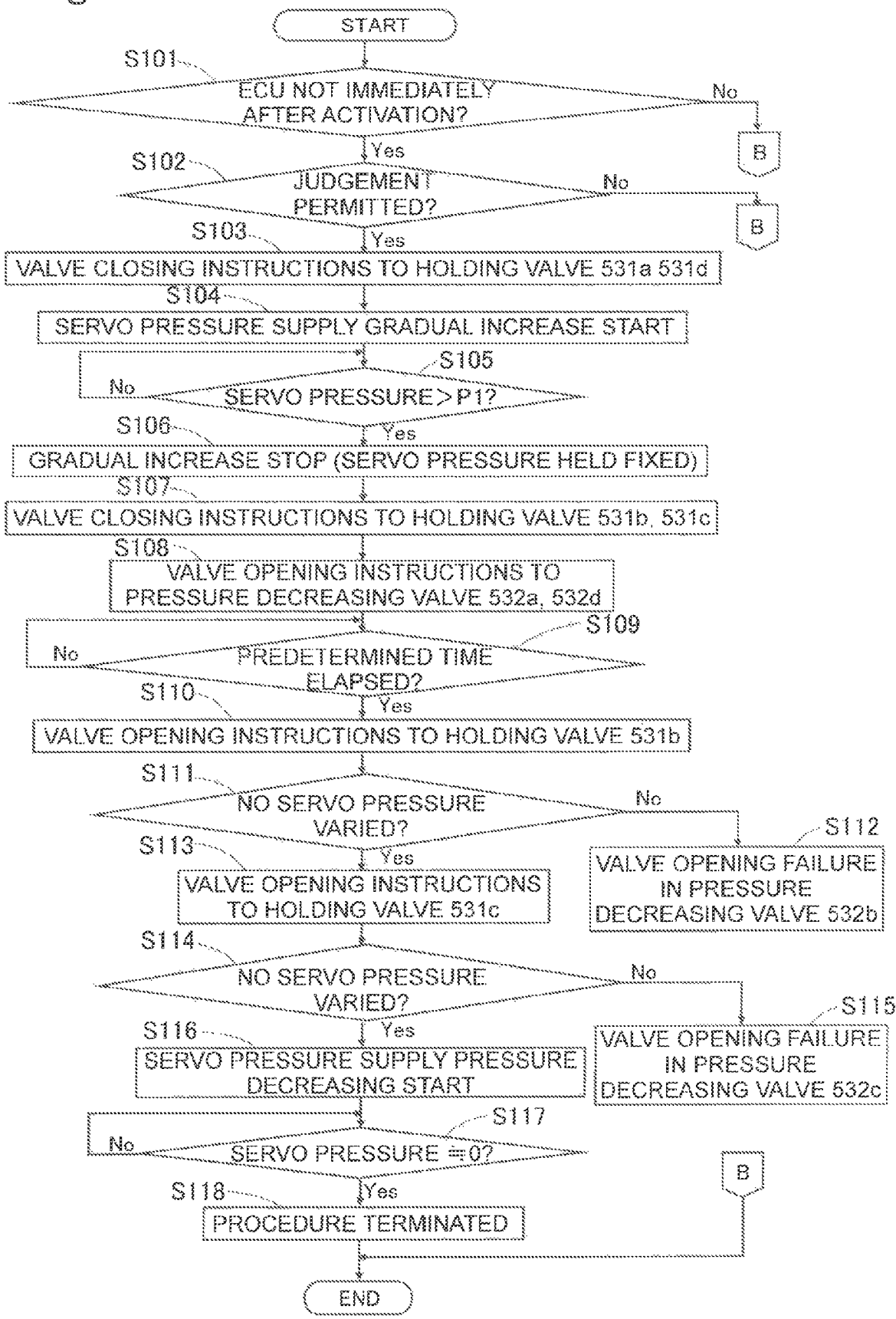
FIG. 5 is a flowchart which explains the first abnormality judgement control according to the embodiment.

The flow of control for the first abnormality judgement will be explained with reference to FIGS. 4 and 5. First, the brake ECU 6 judges whether the brake ECU 6 itself is currently in a state immediately after the activation or not (S101). If the brake ECU 6 is in the state immediately after the activation, in other words, in the state immediately after the ignition switch of the vehicle is turned ON by the operator of the vehicle, it is possible that the brake operation is being performed and accordingly, the failure judgement is not executed. It is preferable to execute the failure judgement when no brake operation is predicted or expected such as for example, upon factory shipment, vehicle inspection, after ignition being turned OFF, or during no operator onboard, etc. If the brake ECU 6 is not in the state immediately after the activation (S101; Yes), then the brake ECU 6 judges whether the failure judgement is permissible state or not by inspecting each signal (S102). The expression of "permissible state" means that for example, state that each pressure sensor 73 and 74 is not in ineffective and at the same time the state that no disconnection is detected by the disconnection detection. In this state, at least one of the first and the second control valves 22 and 23 is in an open state and all of the holding valves 531*a* through 531*d* and the pressure decreasing valves 532*a* through 532*d* are in non-energized state (OFF state).

When the current state is the permissible state (S102; Yes), the abnormality judging portion 61 executes closing instructions to the holding valves 531*a* and 531*d* (S103). Then, the abnormality judging portion 61 starts the control (gradual pressure increase control) of gradually increasing the servo pressure by controlling the servo pressure generating device 4 to the pressure increasing side (S104: servo pressure supply gradual pressure increase start). It is noted that the abnormality judging portion 61 according to the embodiment is generating a preparatory servo pressure in the servo chamber 1A before the step S103, by closing (ON) the pressure decreasing valve 41 and opening (ON) the pressure increasing valve 42. The preparatory servo pressure is set to the fluid pressure that would not advance the first master piston 14 (for example, the maximum fluid pressure not to advance the first master piston 14).

The abnormality judging portion 61 executes the pressure increase control until the servo pressure reaches to the predetermined pressure P1 which is preset in advance (S105) and when the servo pressure reaches to the predetermined pressure P1, the abnormality judging portion 61 stops the execution of the gradual pressure increase control (S106; servo pressure held fixed). The servo pressure is held to be a fixed pressure level by the servo pressure generating device 4 and the abnormality judging portion 61 executes the closing instructions to the holding valves 531*b* and 531*c* (S107). Thus, the fluid communication between the master cylinder 1 and the actuator 5 is interrupted and then, the abnormality judging portion 61 executes the opening instructions to the pressure decreasing valve 532*a* and 532*d* (S108). After a predetermined time elapsed from the opening instructions (S109; Yes), the abnormality judging portion 61 executes opening instructions to the holding valve 531*b* (S110).

The abnormality judging portion 61 receives the detection value from the pressure sensor 74 and judges whether or not the servo pressure is changed accompanying the opening of the holding valve 531*b* (S111). According to the embodiment, the abnormality judging portion 61 judges whether or not the servo pressure is equal to or less than a first threshold value which is set in advance to be the value less than the predetermined pressure P1 (S111). Stated in another way, the abnormality judging portion 61 judges whether or not the advancement amount of the first master piston 14 accompanying the opening of the holding valve 531*b* is equal to or less than the first range, by means of the servo pressure (value of the pressure sensor 74). When the servo pressure is changed, and becomes equal to or less than the first threshold value (S111; no), the abnormality judging portion 61 judges that the pressure decreasing valve 532*b* is in a valve opening failure state (S112). An example of the servo pressure change at the abnormal state is indicated in FIG. 4 with a dotted line.

On the other hand, when the servo pressure is not changed (S111; Yes), the abnormality judging portion 61 judges that the pressure decreasing valve 532*b* is not in the valve opening failure state and executes the opening instructions to the holding valve 531*c* (S113). The abnormality judging portion 61 judges whether or not the servo pressure is changed accompanying the opening of the holding valve 531*c*, as similar to the step S111 (S114). If the servo pressure is changed and becomes equal to or less than the first threshold value (S114; No), the abnormality judging portion 61 judges that the pressure decreasing valve 532*c* is in a valve opening failure state (S115). On the other hand, if the servo pressure is not changed (S114; Yes), the abnormality judging portion 61 judges that the pressure decreasing valve 532*c* is not in a valve opening failure state and starts pressure decreasing control of the servo pressure (S116; servo pressure supply pressure decrease start). When the value of the servo pressure becomes approximately zero (0) (S117; Yes), the abnormality judging portion 61 executes termination procedure (S118). The first abnormality judgement control is executed similarly for the pressure decreasing valves 532*a* and 532*d* as well.

According to the first abnormality judgement control, the valve opening failures of the pressure decreasing valves 532a through 532d can be accurately detected without using wheel pressure sensors. Further, in the first abnormality judgement control, noise of fluid flow is generated only when the valve opening failure is detected in any of the pressure decreasing valves 532a through 532d. In other words, if all of the pressure decreasing valves 532a through 532d are in normal state, such noise can be suppressed and a quiet abnormality judgement can be performed. It is noted here that the abnormality judging portion 61 may be set to operate both holding valves 531b and 531c to open simultaneously at the step S110 in the process of the first control. In such situation, the abnormality judging portion 61 judges that at least one of the pressure decreasing valves 532b and 532c is in a valve opening failure state, when the advancement amount of the first master piston 14 accompanying the valve opening operation of the holding valves 531b and 531c is equal to or more than the predetermined first range.

(Second Abnormality Judgement Control)

Next, the second abnormality judgement control for detecting failures in the holding valves 531a through 531d and/or pressure decreasing valves 532a through 532d will be explained hereinafter. The abnormality judging portion 61 executes the second control which after giving instructions to the subject valve for judgement to close, makes the first master piston 14 advance by the servo pressure generating device 4 and executes instructions to the subject valve for the judgement to open. The advancement amount of the first master piston 14 accompanying the completion of execution of the second control is equal to or less than the predetermined second threshold value, the abnormality judging portion 61 judges that the subject valve is in a failure state (valve closing failure or valve opening failure state).

Figure 6:
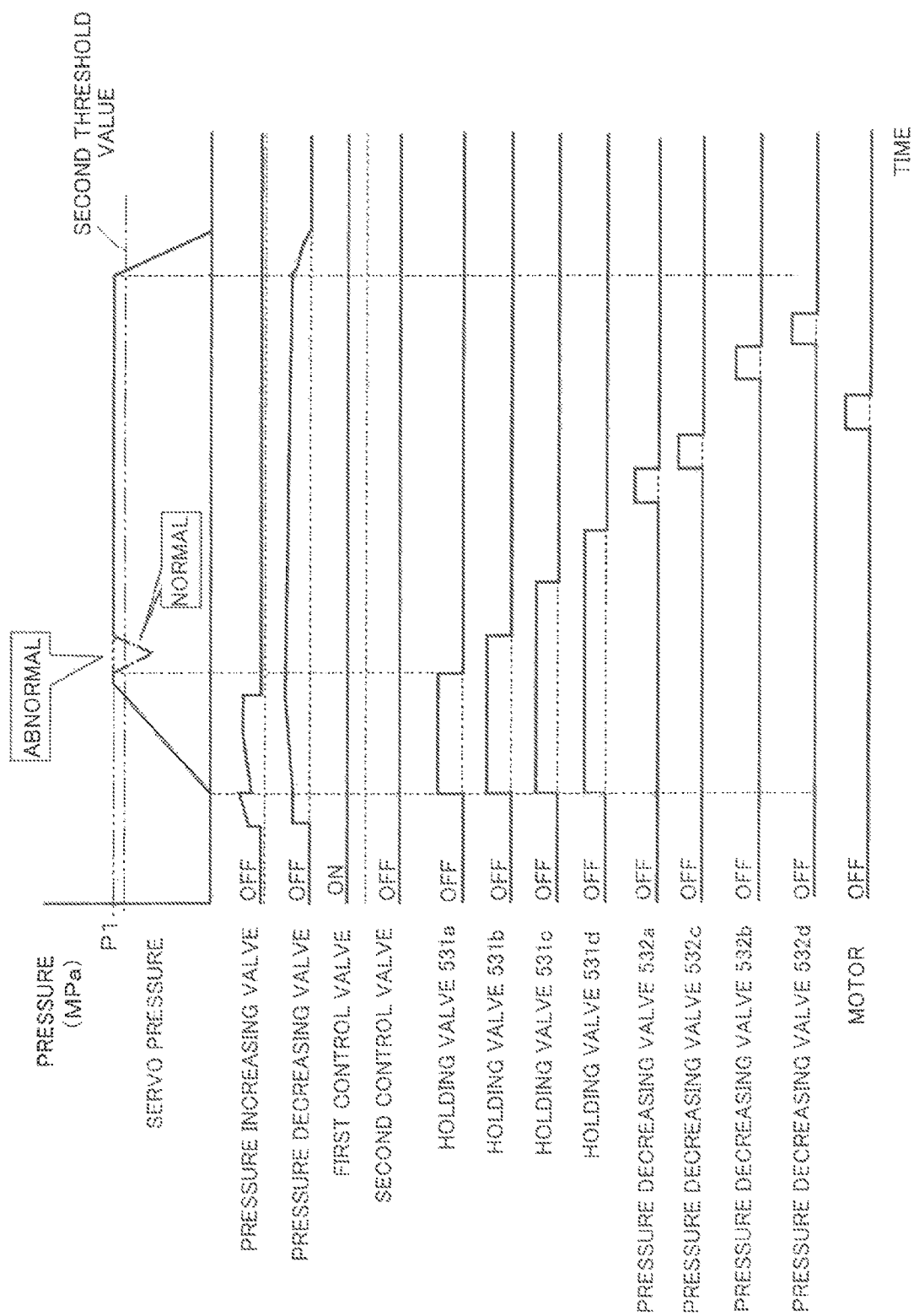
FIG. 6 is a time chart which explains a second abnormality judgement control according to the embodiment.
Figure 7:
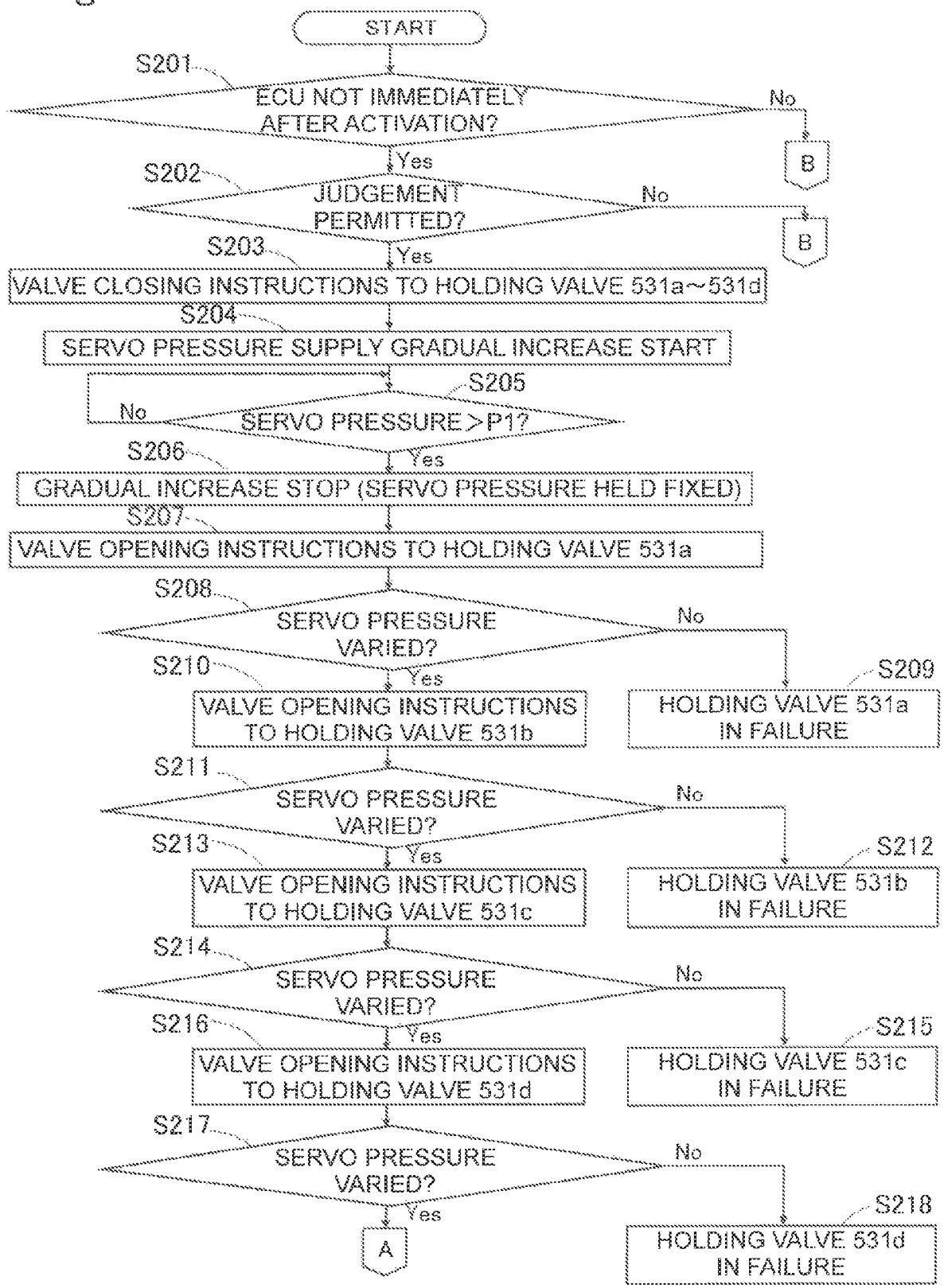
FIG. 7 is a flowchart which explains the second abnormality judgement control according to the embodiment; and, FIG. 8 is a flowchart which explains the second abnormality judgement control according to the embodiment.
Figure 8:
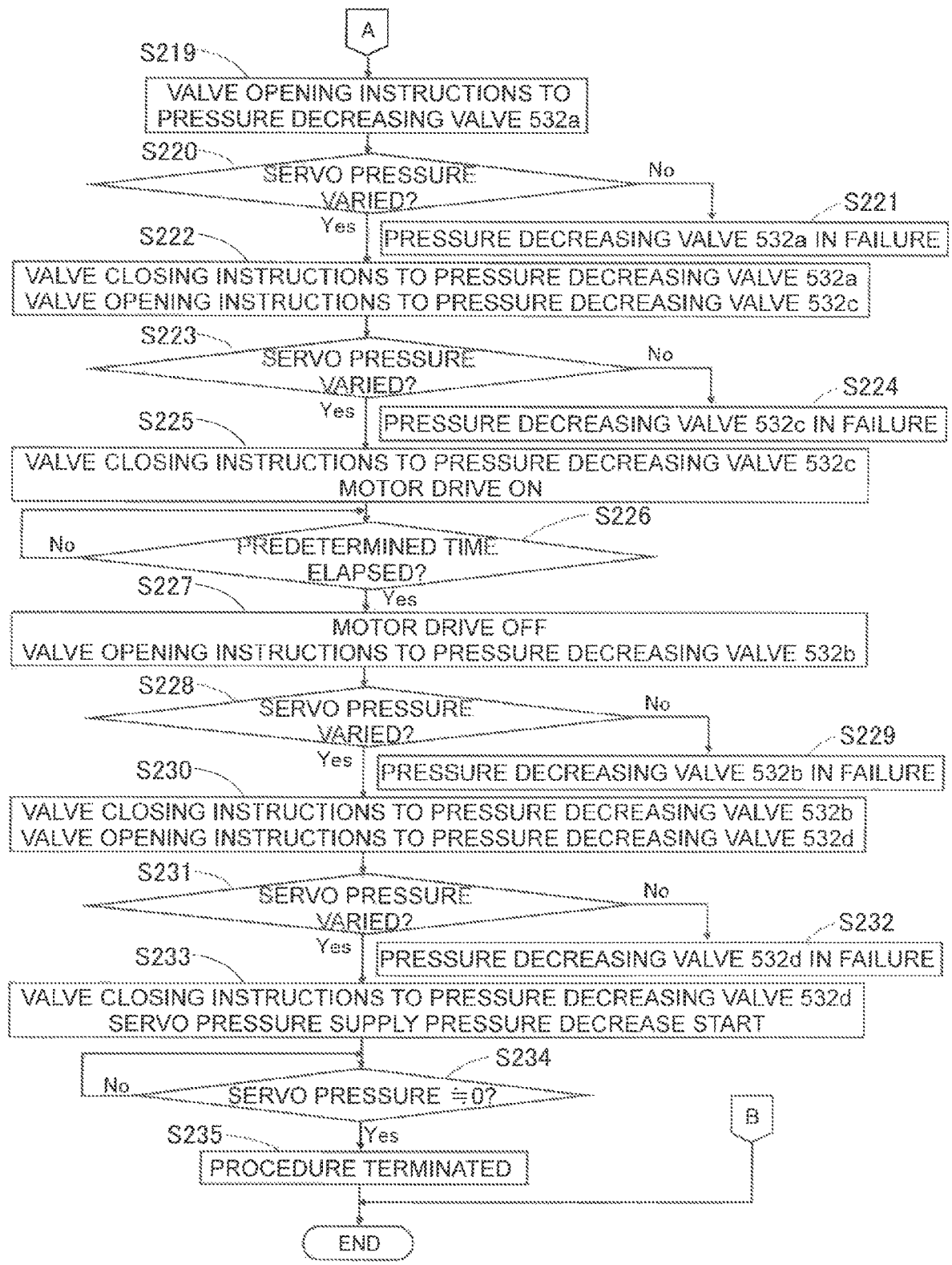

In more detail, as shown in FIGS. 6, 7 and 8, first, the brake ECU 6 judges whether the brake ECU 6 itself is currently in a state immediately after the activation or not (S201). If the brake ECU 6 is not in the state immediately after the activation (S201; Yes), then the brake ECU 6 judges whether the failure judgement is permissible state or not by inspecting each signal (S202). In this state, at least one of the first and the second control valves 22 and 23 is in an open state and all of the holding valves 531a through 531d and the pressure decreasing valves 532a through 532d are in non-energized state (OFF state).

When the current state is the permissible state (S202; Yes), the abnormality judging portion 61 executes closing instructions (ON) to the holding valves 531a through 531d (S203). If not all of the holding valves 531a through 531d are in valve opening failure state, the fluid communication between the master cylinder 1 and the actuator 5 is interrupted and then the abnormality judging portion 61 starts the control (gradual pressure increase control) of gradually increasing the servo pressure by controlling the servo pressure generating device 4 to the pressure increasing side (S204: servo pressure supply gradual pressure increase start). It is noted that the abnormality judging portion 61 according to the embodiment is generating a preparatory servo pressure in the servo chamber 1A before the step S103. The abnormality judging portion 61 executes the pressure increase control until the servo pressure reaches to the predetermined pressure P1 (S205) and when the servo pressure reaches to the predetermined pressure P1, the abnormality judging portion 61 stops the execution of the gradual pressure increase control (S206; servo pressure held fixed). The abnormality judging portion 61 executes the valve opening instructions to the holding valve 531a (S207).

It is noted here that if the holding valve 531a is in a normal state (not in a valve closing failure state nor in a valve opening state), the holding valve 531a closes in response to the closing instructions in the step S203. Then the servo pressure increases thereby to generate a pressure differential between the master pressure and the wheel pressure of the wheel cylinder 541. (Master pressure is greater than the wheel pressure). Under this state, if the holding valve 531a opens in response to the opening instructions at the step S207, the fluid communication between the master cylinder 1 and the wheel cylinder 541 is established to promptly dissolve the pressure differential state therebetween. Then the master pressure decreases and in response to the decrease of the master pressure, the first master piston 14 advances to temporarily drop the servo pressure.

On the other hand, if the holding valve 531a is in a valve closing failure state, since the holding valve 531a is stacked, for example, under the closed state, although a pressure differential can be generated between the master pressure and the wheel pressure, the holding valve 531a does not open even receiving the opening instructions at the step S207, there occurs no phenomenon of dissolution the pressure differential and accordingly, the master pressure is not changed and the second master piston 15 does not advance. Accordingly, the servo pressure is not changed. Further, if the holding valve 531a is in a valve opening failure state, the holding valve 531a does not close even receiving the valve closing instructions at the step S203. The servo pressure increases keeping the establishment of fluid communication between the master cylinder 1 and the wheel cylinder 541. Thus, the master pressure and the wheel pressure of the wheel cylinder 541 become equal and no pressure differential occurs therebetween. Accordingly, even the valve opening instructions are executed to the holding valve 531a at the step S207, the master pressure is not changed. In other words, the second master piston 15 does not advance and the servo pressure is not changed. By using this principle, the abnormality judging portion 61 executes the second abnormality judgement control to the holding valves 531a through 531d.

The abnormality judging portion 61 receives the detection value from the pressure sensor 74 and judges whether or not the servo pressure is changed accompanying the opening of the holding valve 531a (S208). According to the embodiment, the abnormality judging portion 61 judges whether or not the servo pressure is equal to or less than a second threshold value which is set in advance to be the value less than the predetermined pressure P1 (S208). Stated in another way, the abnormality judging portion 61 judges whether or not the advancement amount of the first master piston 14 accompanying the opening of the holding valve 531a is equal to or less than the second range, by means of the servo pressure (value of the pressure sensor 74). When the servo pressure is not changed (S208; No), the abnormality judging portion 61 judges that the holding valve 531a is in a failure state (S209). In FIG. 6, an example of servo pressure change at the normal state and abnormal state is shown, wherein the dot-chain line indicates normal operation servo pressure and the broken line indicates the abnormal operation servo pressure. Other example changes of the servo pressure occurred at normal and abnormal operation thereafter are omitted from the drawing. Other example changes of the servo pressure occurred at normal and abnormal operation thereafter are omitted from the drawing.

On the other hand, when the servo pressure is changed and becomes equal to or less than the second threshold value (S208; Yes), the abnormality judging portion 61 judges that the holding valve 531a is not in a failure state and executes the valve opening instructions to the holding valve 531b after the predetermined time lapsed after the execution of the opening instructions to the holding valve 531a (S210). Then, similar to the step S208, the abnormality judging portion 61 judges whether or not the servo pressure is changed (S211). When the servo pressure is not changed (S211; No), the abnormality judging portion 61 judges that the holding valve 531b is in a failure state (S212). On the other hand, if the servo pressure is changed and becomes equal to or less than the second threshold value (S211; Yes), the abnormality judging portion 61 judges that the holding valve 531b is not in a failure state and executes the valve opening instructions to the holding valve 531c after the predetermined time lapsed after the execution of the opening instructions to the holding valve 531b (S213).

Then, as similar to the above, the abnormality judging portion 61 judges whether or not the servo pressure is changed accompanying the opening of the holding valve 531c (S214). If the servo pressure is not changed (S214; No), the abnormality judging portion 61 judges that the holding valve 531c is in a failure state (S215). On the other hand, if the servo pressure is changed and becomes equal to or less than the second threshold value (S214; Yes), the abnormality judging portion 61 judges that the holding valve 531c is not in a failure state and executes the valve opening instructions to the holding valve 531d after the predetermined time lapsed after the execution of the opening instructions to the holding valve 531c (S216). The abnormality judging portion 61, similar to the above, judges whether or not the servo pressure is changed accompanying the opening of the holding valve 531d (S217). If the servo pressure is not changed (S217; No), the abnormality judging portion 61 judges that the holding valve 531d is in a failure state (S218). On the other hand, as shown in FIG. 8, when the servo pressure is changed and becomes the value equal to or less than the second threshold value (S217; Yes), the abnormality judging portion 61 judges that the holding valve 531d is not in a failure state and executes opening instructions to the pressure decreasing valve 532a (S219).

It is noted here that if the pressure decreasing valve 532a is in a normal state (not in a valve closing failure state nor in a valve opening state), since the pressure decreasing valve 532a has been in a closed state (OFF) since the start of the second abnormality judgement control and when the servo pressure increases and the holding valve 531a is opened, a pressure difference is generated between the wheel cylinder 541 side through the pressure decreasing valve 532a and the reservoir 533a side. Under this state, when the pressure decreasing valve 532a is opened in response to the opening instructions at the step S219, a sudden dissolution of the pressure difference state occurs to decrease the wheel pressure and the master pressure. In response to this pressure decrease, the second master piston 15 advances first and following this movement, the first master piston 14 advances to temporarily decrease the servo pressure.

On the other hand, if the pressure decreasing valve 532a is in a valve closing failure state, the pressure decreasing valve 532a does not open even receiving the opening instructions at the step S219 and there occurs no phenomenon of dissolution the pressure differential and the master pressure is not changed. In other words, the second master piston 15 does not advance and the servo pressure is not changed. Further, when the pressure decreasing valve 532a is in a valve opening failure state, the difference pressure state through the pressure decreasing valve 532a is not generated and the master pressure does not change even receiving the opening instructions at the step S219. In other words, the second master piston 15 does not advance and the servo pressure is not changed. By using this principle, the abnormality judging portion 61 executes the second abnormality judgment control to the pressure decreasing valves 532a through 532d.

The abnormality judging portion 61, similar to the above, judges whether or not the servo pressure is changed accompanying the opening of the pressure decreasing valve 532a (S220). If the servo pressure is not changed (S220; No), the abnormality judging portion 61 judges that the pressure decreasing valve 532a is in a failure state (S221). On the other hand, when the servo pressure is changed and becomes the value equal to or less than the third threshold value (S220; Yes), the abnormality judging portion 61 judges that the pressure decreasing valve 532a is not in a failure state and executes a valve closing instructions to the pressure decreasing valve 532a and a valve opening instructions to the pressure decreasing valve 532c after a predetermined time elapsed from the execution of the opening instructions to the pressure decreasing valve 532a (S222).

Then, the abnormality judging portion 61, similar to the above, judges whether or not the servo pressure is changed accompanying the opening of the pressure decreasing valve 532c (S223). If the servo pressure is not changed (S223; No), the abnormality judging portion 61 judges that the pressure decreasing valve 532c is in a failure state (S224). On the other hand, when the servo pressure is changed and becomes the value equal to or less than the third threshold value (S223; Yes), the abnormality judging portion 61 judges that the pressure decreasing valve 532c is not in a failure state and then executes a valve closing instructions to the pressure decreasing valve 532c and drives the motor 535 after a predetermined time elapsed from the execution of the opening instructions to the pressure decreasing valve 532c (S225). After a predetermined time elapsed from the execution of driving motor (S226; Yes), the abnormality judging portion 61 stops the driving of the motor 535 and executes the valve opening instructions to the pressure decreasing valve 532b (S227). By the driving of the motor 535, the pumps 534a and 534b are driven and the operating fluid in the reservoirs 533a and 533b returns to the master cylinder 1 side.

Then, the abnormality judging portion 61, similar to the above, judges whether or not the servo pressure is changed accompanying the opening of the pressure decreasing valve 532b (S228). If the servo pressure is not changed (S228; No), the abnormality judging portion 61 judges that the pressure decreasing valve 532b is in a failure state (S229). On the other hand, when the servo pressure is changed and becomes the value equal to or less than the third threshold value (S228; Yes), the abnormality judging portion 61 judges that the pressure decreasing valve 532b is not in a failure state and then executes a valve closing instructions to the pressure decreasing valve 532b and a valve opening instructions to the pressure decreasing valve 532d after a predetermined time elapsed from the execution of the opening instructions to the pressure decreasing valve 532b (S230).

Then, the abnormality judging portion 61, similar to the above, judges whether or not the servo pressure is changed accompanying the opening of the pressure decreasing valve 532d (S231). If the servo pressure is not changed (S231; No), the abnormality judging portion 61 judges that the pressure decreasing valve 532d is in a failure state (S232). On the other hand, when the servo pressure is changed and becomes the value equal to or less than the third threshold value (S231; Yes), the abnormality judging portion 61 judges that the pressure decreasing valve 532*d* is not in a failure state and then executes a valve closing instructions to the pressure decreasing valve 532*d* and starts pressure decreasing control of the servo pressure (S233; servo pressure supply pressure decrease start). When the value of the servo pressure becomes approximately zero (0) (S234; Yes), the abnormality judging portion 61 executes termination procedure (S235). As explained, the second abnormality judgement control can accurately detect the abnormalities in the holding valves 531*a* through 531*d* and/or the pressure decreasing valves 532*a* through 532*d*, without using the wheel pressure sensor.

(Others)

The invention is not limited to the embodiment explained above. For example, the advancement amount of the first master piston 14 is detected by the change of the servo pressure (value of the pressure sensor 74) according to the embodiment, however, such detecting method may be changed depending on the structure of the piston drive (for example, use of electrically operated booster). Further, an ESC (Electronic Stability Control) device is substituted for the actuator 5. The abnormality judgement control (the first abnormality judgement control or the second abnormality judgement control) may be executed independently on each of the subject valves for judgement.

(Summary)

The vehicle brake device of the embodiment can be described as follows: The vehicle brake device of the embodiment which generates a braking force at a wheel of a vehicle based on a hydraulic pressure generated in a master chamber 1D by a movement of a master piston 14, comprises a valve which opens and closes a fluid passage connected to the master chamber 1D and at the same time which is a subject valve (531*a* through 531*d*, 53*a* through 532*d*) for a subject of failure judgement and an abnormality judging portion 61 which judges whether or not the subject valve is in abnormal state based on the advancement amount of the master piston 14 accompanying an opening of the subject valve.

The vehicle brake device of the embodiment comprises an anti-lock brake system which is formed by a reservoir 533*a* (533*b*) into which the brake fluid in a first wheel cylinder 541 (543) of a first wheel of the vehicle and the brake fluid in a second wheel cylinder 542 (544) of a second wheel of the vehicle are discharged, a first inlet valve 531*a* (531*c*) disposed between the master chamber 1E (1D) and the first wheel cylinder 541 (543), a first outlet valve 532*a* (532*c*) disposed between the first wheel cylinder 541 (543) and the reservoir 533*a* (533*b*), a second inlet valve 531*b* (531*d*) disposed between the master chamber 1E (1D) and the second wheel cylinder 542 (544) and a second outlet valve 532*b* (532*d*) disposed between the second wheel cylinder 542 (544) and the reservoir 533*a* (533*b*), wherein the vehicle brake device further comprises a driving portion 4 which drives the master piston 14, wherein the abnormality judging portion 61 executes a first control that instructs the first outlet valve 532*a* (532*c*) to close, the first inlet valve 531*a* (531*c*) to open, the second inlet valve 531*b* (531*d*) to close, and the second outlet valve 532*b* (532*d*) to close, next, the master piston 14 to advance, next, the first inlet valve 531*a* (531*c*) to close, next, the second outlet valve 532*b* (532*d*) to open, and next, the first inlet valve 531*a* (531*c*) to open. In this first control, when the advancement amount of the master piston 14 accompanying the last opening of the first inlet valve 531*a* (531*c*) is equal to or more than a predetermined first range, the abnormality judging portion 61 judges that the first outlet valve 532*a* (532*c*) is in a valve opening failure.

Further, the abnormality judging portion 61 advances the master piston 14 by the driving portion 4 after instructing the subject valve to close, and next, executes a second control that instructs the subject valve to open and when the advancement of the master piston 14 accompanying the completion of the execution of the second control is equal to or less than a predetermined second range, the abnormality judging portion 61 judges that the subject valve is in a failure state.

Further, according to the vehicle brake device with the anti-lock brake system of the embodiment, the abnormality judging portion 61 executes the second control that instructs the first inlet valve 531*a* (531*c*) to close and the second inlet valve 531*b* (531*d*) to close, next, the master piston 14 to advance by the driving portion 4 and next, executes to instructs the first inlet valve 531*a* (531*c*) to open. When the advancement of the master piston 14 accompanying the completion of the second control is equal to or less than the predetermined second range, the abnormality judging portion 61 judges that the first inlet valve 531*a* (531*c*) is in a failure state.

Still further, according to the vehicle brake device with the anti-lock brake system of the embodiment, the abnormality judging portion 61 executes the second control that instructs the first inlet valve 531*a* (531*c*) to open and the second inlet valve 531*b* (531*d*) to open, next, the master piston 14 to advance by the driving portion 4 and next, executes to instruct the first outlet valve 532*a* (532*c*) to open. When the advancement of the master piston 14 accompanying the completion of the second control is equal to or less than a predetermined third range, the abnormality judging portion 61 judges that the first outlet valve 532*a* (532*c*) is in a failure state. It is noted here that either of opening of the first inlet valve 531*a* (531*c*) and the second inlet valve 531*b* (531*d*) and advancement of the master piston 14 may be executed first.

REFERENCE SIGNS LIST

1; master cylinder, 11; main cylinder, 12; cover cylinder 13; input piston, 14; first master piston, 15; second master piston, 1A; servo chamber, 1B; first hydraulic pressure chamber, 10; second hydraulic pressure chamber, 1D; first master chamber, 1E; second master chamber, 10; brake pedal, 171; reservoir, 2; reaction force generating device, 22; first control valve, 23; second control valve, 4; servo pressure generating device, 41; pressure decreasing valve, 42; pressure increasing valve, 431; accumulator, 44; regulator, 445; control piston, 4D; first pilot chamber, 5; actuator, 531*a* through 531*d*; holding valve (inlet valve, subject valve), 532*a* through 532*d*; pressure decreasing valve (outlet valve, subject valve), 533*a*, 533*b*; reservoir, 534*a*, 534*b*; pump, 535; motor, 541, 542, 543, 544; wheel cylinder, 5FR, 5FL, 5RR and SRL; wheel, BF; hydraulic pressure braking force generating device, 6; brake ECU, 60; control portion, 61; abnormality judging portion, 71; stroke sensor, 72; brake stop switch, 73, 74, 75; pressure sensor, 76; wheel speed sensor.

The invention claimed is:

1. A vehicle brake device which generates a braking force at a wheel of a vehicle based on a hydraulic pressure generated in a master chamber by a movement of a master piston, comprising:

a valve which is configured to open and close a fluid passage connected to the master chamber and at the same time which is a subject valve for a subject of failure judgement;

an abnormality judging portion which is configured to judge whether or not the subject valve is in an abnormal state;

an anti-lock brake system having a reservoir, into which a brake fluid in a first wheel cylinder of a first wheel of the vehicle and the brake fluid in a second wheel cylinder of a second wheel of the vehicle are discharged, a first inlet valve disposed between the master chamber and the first wheel cylinder, a first outlet valve disposed between the first wheel cylinder and the reservoir, a second inlet valve disposed between the master chamber and the second wheel cylinder, and a second outlet valve disposed between the second wheel cylinder and the reservoir; and a driving portion which is configured to drive the master piston, wherein the abnormality judging portion executes a first control that instructs the first outlet valve to close, the first inlet valve to open, the second inlet valve to close and the second outlet valve to close, next, the master piston to advance, next, the first inlet valve to close, next, the second outlet valve to open and next, the first inlet valve to open, wherein when an advancement amount of the master piston accompanying the last opening of the first inlet valve in the first control is equal to or more than a predetermined first range, the abnormality judging portion judges that the first outlet valve is in a valve opening failure state.

2. The vehicle brake device according to claim 1, wherein the vehicle brake device further includes a pressure sensor, wherein the driving portion is configured to generate a servo pressure in a servo chamber defined rearward of the master piston and advances the master piston by the servo pressure;

the pressure sensor is configured to detect the servo pressure; and the abnormality judging portion uses a result of detection of the pressure sensor as the advancement amount of the master piston.

3. A vehicle brake device which generates a braking force at a wheel of a vehicle based on a hydraulic pressure generated in a master chamber by a movement of a master piston, comprising:

a valve which is configured to open and close a fluid passage connected to the master chamber and at the same time which is a subject valve for a subject of failure judgement;

an abnormality judging portion which is configured to judge whether or not the subject valve is in an abnormal state; and a driving portion which is configured to drive the master piston, wherein the abnormality judging portion advances the master piston by the driving portion after instructing the subject valve to close, and next, executes a second control that instructs the subject valve to open and wherein, when an advancement amount of the master piston accompanying the completion of the execution of the second control is equal to or less than a predetermined second range, the abnormality judging portion judges that the subject valve is in a failure state.

4. The vehicle brake device according to claim 3, wherein the vehicle brake device further includes a pressure sensor, wherein the driving portion is configured to generate a servo pressure in a servo chamber defined rearward of the master piston and advances the master piston by the servo pressure;

the pressure sensor is configured to detect the servo pressure; and the abnormality judging portion uses a result of detection of the pressure sensor as the advancement amount of the master piston.

* * * * *